United States Patent [19]

Diamantoglou

[11] Patent Number: 5,008,385

[45] Date of Patent: * Apr. 16, 1991

[54] CELLULOSE DERIVATIVES AND FIBERS AND MEMBRANES MADE THEREFROM

[75] Inventor: Michael Diamantoglou, Erlenbach, Fed. Rep. of Germany

[73] Assignee: Akzo N.V., Netherlands

[ * ] Notice: The portion of the term of this patent subsequent to Jan. 1, 2008 has been disclaimed.

[21] Appl. No.: 219,309

[22] Filed: Jul. 15, 1988

[30] Foreign Application Priority Data

Jul. 18, 1987 [DE] Fed. Rep. of Germany ....... 3723897

[51] Int. Cl.[5] .................... C08B 3/20; C08B 11/20; C08B 15/05; D01F 2/02
[52] U.S. Cl. ................. 536/56; 536/59; 536/62; 536/65; 536/66; 536/67; 536/68; 536/69; 536/81; 536/82; 536/84; 536/85; 536/87; 536/89; 536/90; 536/91; 536/92; 536/93; 536/94; 536/95; 536/97; 536/98; 536/100; 536/124; 264/187
[58] Field of Search ............... 536/56, 58, 59, 61, 536/62, 63, 64, 66, 67, 68, 69, 81, 82, 84, 85, 87, 89, 90, 91, 92, 93, 94, 95, 97, 98, 99, 100–101, 124–126; 264/187

[56] References Cited

U.S. PATENT DOCUMENTS 2,136,299 11/1938 Haskins .................... 536/22
4,352,770 10/1982 Turbak et al. ............. 264/187
4,520,192 5/1985 Namikoshi ................. 536/66

*Primary Examiner*—Thurman Page
*Assistant Examiner*—C. Azpuru
*Attorney, Agent, or Firm*—Oliff & Berridge

[57] ABSTRACT

Cellulose derivatives are disclosed which have the following formula:

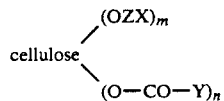

wherein

Z is selected from the group consisting of alkylene, alkenylene, alkynylene, cycloalkylene or benzylene or xylylene radicals, which may or may not be substituted;

X is selected from the group consisting of —H, —NR$_2$, —N$^+$R$_3$, —CN, —COOH, —SO$_3$H, —SO$_3$H, —PO(OR)$_2$, CONR$_2$ or —Si(OR)$_3$;

R is selected from the group consisting of hydrogen, alkyl and alkenyl groups having from 1 to 25 carbon atoms, and cycloalkyl, tolyl and phenyl groups;

Y is selected from the group consisting of alkyl, alkenyl, alkynyl groups having from 1 to 36 carbon atoms, which may or may not be substituted, cycloalkyl, phenyl, tolyl and benzyl groups,

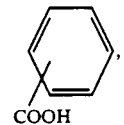

COOH

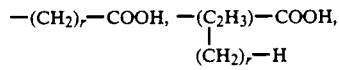

(—CH=CH—COOH), and NHR, where R has the same meaning as in X, and m=0 to 2.5
n=0.01 to 2.95, with the provision that, when m=0, n≧1.55, if Y is an alkyl radical with 1 to 5 carbon atoms, 3—(CH$_2$)$_r$ radical with r—0, 1 or 2 or a phthalic acid radical, and also the degree of polymerization being higher than 400. These cellulose derivatives can be synthesized by homogeneous reaction in a mixture of dimethylacetamide and/or N-methylpyrrolidone with LiCl, preferably after activation of the cellulose starting material in the absence of LiCl. These cellulose derivatives are suitable for use as membranes and fibers, especially in hemodialysis applications.

23 Claims, No Drawings

CELLULOSE DERIVATIVES AND FIBERS AND MEMBRANES MADE THEREFROM

DESCRIPTION OF THE TECHNICAL FIELD

The present invention relates to cellulose derivatives which can be synthesized by homogeneous reaction in dimethylacetamide and lithium chloride. These cellulose derivatives have particular utility as fibers and membranes suitable for use in hemodialysis.

Cellulose solutions using lithium chloride and dimethylacetamide as the solvent are known from U.S. Pat. No. 4,278,790. The solutions can contain up to 8% of lithium chloride and up to approximately 3% of cellulose. Cellulose derivatives can also be synthesized in these cellulose solutions. According to the U.S. Patent, the solutions are prepared by introducing cellulose into a mixture of dimethylacetamide and lithium chloride and first heating for a relatively long time at approximately 150° C. Later, the solution which has then been formed is cooled to room temperature with stirring.

Moreover, water-insoluble fibers of cellulose esters are known from West German Laid-open Application 3,312,022 as well as from West German Laid-open Application 3,246,417. They exhibit an extremely high adsorption capacity for water and physiological fluids. This may be an advantage for many areas of use, but it is a disadvantage for many others.

Leukopenia is a lowering of the number of leukocytes (white blood cells) in the blood circulation, and can occur during dialysis when cellulose fibers and membranes are used in the dialysis filter. The number of white blood cells in humans is ca. 4,000 to 12,000 cells/mm$^3$.

Leukopenia during dialysis is most pronounced 15 to 20 minutes after the beginning, and at that time the neutrophils (i.e., the leukocytes which can stain with neutral or simultaneously with acid and basic dyes) can disappear almost completely. Thereafter the number of leukocytes recovers within approximately one hour to almost the initial value or higher.

If a new dialyzer is connected after recovery of the leukocytes, leukopenia occurs again to the same extent.

During hemodialysis by means of membranes of regenerated cellulose, not only leukopenia but also significant complement activation has been observed. The complement system in the blood serum is a complex plasma-enzyme system which consists of many components and which participates in various ways in the defense against damage due to invading foreign cells (bacteria, etc.). If antibodies related to the invading organism are present, the antibody with antigenic structures of the foreign cells can be activated in complement-specific manner by the complex, otherwise complement activation takes place by an alternative route via special surface features of the foreign cells. The complement system depends on a large number of plasma proteins. After activation, these proteins react specifically with each other in a certain sequence, and finally a cell-damaging complex which destroys the foreign cells is formed.

Peptides which cause inflammatory phenomena and sometimes also have undesired pathological consequences for the organism are released from individual components. It is assumed that the activation in the case of hemodialysis membranes of regenerated cellulose takes place via the alternative route. These complement activation reactions are followed objectively by determination of the complement fragments C3a and C5a.

In this connection, the following references are cited: D. E. Chenoweth et al., Kindney International Vol. 24, page 764 ff., 1983; and D. E. Chenoweth, Asaio Journal, Vol. 7, page 44 ff., 1984.

In addition to leukopenia and complement activation, the carpal tunnel syndrome can also occur during hemodialysis. These effects have been attributed to the chemical composition of the membranes used in hemodialysis filters. Modified dialysis membranes for reduction of leukopenia and of complement activation have already become known, for example from West German Laid-open Application 3,524,596. The carpal tunnel syndrome is influenced only slightly by the known modified dialysis membranes. Therefore a significant need exists for further modifications of the cellulose, in order to eliminate this phenomenon as well.

An object of the present invention was to synthesize new cellulose derivatives, with which it is possible easily to make membranes as well as fibers and filaments.

Another object of the present invention was to provide membranes and fibers suitable for hemodialysis which minimize leukopenia, complement activation, and carpal tunnel syndrome in patients undergoing hemodialysis.

SUMMARY OF THE INVENTION

In one aspect, the present invention relates to a cellulose derivative which conforms to the formula

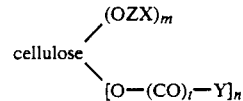

wherein

Z is selected from the group consisting of alkylene, alkenylene, and alkynylene radicals, which may be straight-chain or branched, and wherein the carbon chain may be interrupted by a member selected from the group consisting of O, S, N, P, Si, —CO—, —CONR— and —COO—, and which may be substituted; cycloalkylene radicals, which may have heteroatoms and which may be substituted; arylene, arylalkylene, arylalkenylene and arylalkynylene radicals, which may have heteroatoms and which may be substituted; bisarylalkylene and bisarylene radicals, which may be substituted; condensed aromatic compound radicals, which may be substituted; and heterocyclic compound radicals, which may be substituted;

X is selected from the group consisting of —H, —NR$_2$ —N$^+$R$_3$, —COOH, a carboxylic acid salt, —COOR, CONR$_2$, —CO—R, —CS—R, —CSOH, a salt thereof, —CSOR, CSNR$_2$, —SO$_3$H, a sulfonic acid salt, —SO$_3$R, —SO$_2$—R, —SO$_2$NR$_2$, —SR, —SOR, —SONR$_2$, —PO$_3$H$_2$, a salt thereof, —PO(OR)$_2$, PO$_2$H(NR$_2$), —PO(NR$_2$)$_2$, PO$_2$H$_2$, —POH(OR), —CN, —NO$_2$, —OR, halogen, and —Si(OR)$_3$;

R is selected from the group consisting of hydrogen; alkyl, alkynyl, and alkenyl groups having from 1 to 25 carbon atoms, which may be straight-chain or branched, and which may be substituted; cycloalkyl groups, which may have heteroatoms and which may be substituted; and tolyl, benzyl, and phenyl groups, which may have heteroatoms and which may be substituted;
t=0 or 1, such that when t=1,
Y is selected from the group consisting of a

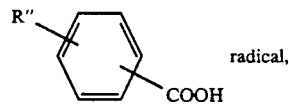 radical,

—(CH$_2$)$_r$—COOH, —(CH$_2$H$_3$)—COOH,
                          |
                        (CH$_2$)$_r$—H

—(C$_2$R''$_4$)—COOH, —CR''=CR''—COOH, —(CH=CH—COOH); —NR'$_2$, NHR', NHSO$_2$-R',—and R';
wherein
R' is selected from the group consisting of alkyl, alkenyl, and alkynyl groups having from 1 to 36 carbon atoms which may be straight-chain or branched and wherein the carbon chain may be interrupted by a member selected from the group consisting of O, S, N, P, Si, —CO—, —CONR—, and —COO—, and which may be substituted; cycloalkyl radicals, which may have heteroatoms and which may be substituted; aryl, arylalkyl, arylalkenyl, and arylalkynyl radicals, which may have heteroatoms and which may be substituted; bisarylalkyl and bisaryl radicals, which may be substituted; condensed aromatic compound radicals, which may be substituted; and heterocyclic compound radicals, which may be substituted;
R'' has the same meaning as X and R';
and
r=1 to 20;
m=0 to 2.5;
n=0.01 to 2.95;
and when
t=0,
Y is a member selected from the group consisting of CS—R', CO—OR', CSNH—R', CSNR'$_2$, SO$_2$—OR', SO$_2$—R', SO$_2$NR'$_2$, SO—R', SONR'$_2$, PO$_3$H$_2$, PO$_2$R'$_2$, POR'$_2$, and PO(OR')$_2$;
and
R' is a member selected from the group consisting of hydrogen; alkyl, alkenyl, and alkynyl groups having from 1 to 36 carbon atoms, which may be straight-chain or branched, wherein the carbon chain may be interrupted by a member selected from the group consisting of O, S, N, P, Si, —CO—, CONR— and —COO—, and which may be substituted; cycloalkyl radicals which may have heteroatoms and which may be substituted; aryl, arylalkyl, arylalkenyl, and aryl-alkynyl radicals, which may have heteroatoms and which may be substituted; bisarylalkyl and bisaryl radicals, which may be substituted; condensed aromatic compound radicals, which may be substituted; and heterocyclic compound radicals, which may be substituted; wherein
m=0 to 2.5, n=0.01 to 2.95, and
wherein the degree of polymerization is higher than 400, and which may be synthesized from cellulose in a mixture of LiCl and one or more members selected from the group consisting of dimethyl-acetamide and N-methylpyrrolidone.
In a second aspect, the present invention relates to a process of the above described cellulose derivatives,
wherein a member selected from the group consisting of cellulose and waterinsoluble cellulose ethers is activated in a solvent selected from the group consisting of dimethylacetamide, N-methylpyrrolidone, and water and is dissolved after addition of lithium chloride, wherein reaction is effected with a member selected from the group consisting of anhydrides, isocyanates, acid chlorides, ketenes, diketenes, lactones, and sulfones.

DETAILED DESCRIPTION OF THE PREFERRED EMBODIMENTS

As summarized above, the present invention includes cellulose derivatives which conform to the formula:

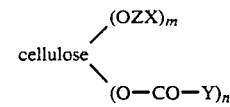

wherein
Z represents an alkylene, alkenylene, alkynylene radical (straight-chain and/or branched, wherein the carbon chain can also be interrupted by heteroatoms such as O, S, N, P, Si as well as CO—, —CONR— or COO— groups), which may or may not be substituted, and/or a cycloalkylene radical (which may or may not have heteroatoms and/or may or may not be substituted) and/or an arylene and/or arylalkylene and/or arylalkenylene and/or arylalkynylene radical (which may or may not have heteroatoms and/or may or may not be substituted) and/or a bisarylalkylene and/or bisarylene radical (which may or may not be substituted) and or a condensed aromatic compound radical (which may or may not be substituted) and/or a heterocyclic compound radical (which may or may not be substituted);
X represents —H, and/or —NR$_2$ and/or —N$^+$R$_3$ and/or COOH even as a salt and/or —COOR and/or CONR$_2$ and/or —CO—R and/or —CS—R and/or —CSOH even as a salt and/or —CSOR and/or CSNR$_2$ and/or —SO$_3$H even as a salt and/or —SO$_3$R and/or —SO$_2$—R and/or —SO$_2$NR$_2$ and/or —SR and/or —SOR and/or —SONR$_2$ and/or —PO$_3$H$_2$ even as a salt and/or —PO(OR)$_2$ and/or PO$_2$H(NR$_2$) and/or —PO(NR$_2$)$_2$ and/or PO$_2$H$_2$ and/or —POH(OR) and/or —CN and/or —NO$_2$ and/or —OR and/or halogen and/or —Si(OR)$_3$,
wherein
R is a hydrogen atom and/or an alkyl, alkenyl, alkynyl of from 1 to 25 carbon atoms (straight-chain and/or branched, and which may or may not be substituted) and/or a cylcoalkyl group (which may or may not have heteroatoms and/or may or may not be substituted) and/or a tolyl and/or benzyl and/or phenyl group (which may or may not have heteroatoms and/or may or may not be substituted;
Y is a

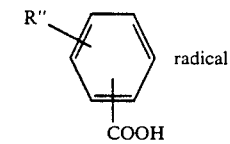 radical and/or a 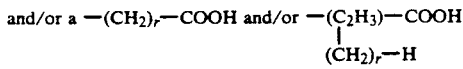

and/or $-(C_2R''_4)-COOH$ and/or $-CR''=CR'''-COOH$ and/or $(-CH=CH-COOH)$ radical and/or an $N'_2$ and/or $NHR'$ and/or $NHSO_2R'-$ and/or $R'-$radical;

R' represents an alkyl, alkenyl, alkynyl group with 1 to 36 carbon atoms (straight-chain and/or branched, wherein the carbon chain can also be interrupted by heteroatoms such as O, S, N, P, Si as well as CO—, CONR— or COO—groups), which may or may not be substituted and/or a cycloalkyl radical (which may or may not have heteroatoms and/or may or may not be substituted) and/or an aryl and/or arylalkyl and/or arylalkenyl and/or arylalkynyl radical (which may or may not have heteroatoms and/or may or may not be substituted) and/or a bisarylalkyl and/or bisaryl radical (which may or may not be substituted) and/or a condensed aromatic compound radical (which may or may not be substituted) and/or a heterocyclic compound radical (which may or may not be substituted);

R" is a member selected from the group consisting of X and R';

$r = 1$ to 20;

$m = 0$ to 2.5;

$n = 0.01$ to 2.95;

and also the degree of polymerization is higher than 400, and which can be synthesized by homogeneous reaction in a mixture of dimethylacetamide and/or N-methylpyrrolidone with LiCl, preferably after activation of the celulose starting material in the absence of LiCl.

As it happens, it was found that it is possible to achieve significantly higher concentrations of cellulose in the solution if the cellulose is first activated at 150° C. for 30 minutes, for example in dimethylacetamide or N-methylpyrrolidone, the cellulose suspended in dimethylacetamide being heated to the desired temperature within, for example, 20 minutes. It is also possible to activate the cellulose by first suspending it in water, for example at room temperature, and then replacing the water by dimethylacetamide. Oxidative decomposition of the cellulose is largely prevented under nitrogen. After the activation stage, the lithium chloride is added at, for example, ca. 100° C., and the suspension is cooled rapidly to below 50° C. and stirrred until complete dissolution of the cellulose. In this process the water content of the solution must remain below 2.2%.

With this method of preparing the solution, it is possible, depending on the degree of polymerization of the added cellulose, to use concentrations of 5 to 14%, using either normal reactors or kneaders for preparation and processing. Both the cellulose dissolved in dimethylacetamide/LiCl and the derivative solutions prepared therefrom are stable for relatively long periods (months). If water-insoluble cellulose ethers are dissolved in the described manner, solutions having concentrations of up to 30 weight percent can be prepared.

A major advantage of the cellulose esters according to the invention is that the obtained products have a relatively high molecular weight with regard to the cellulose structural unit. Despite the high molecular weight, high concentrations can be prepared and processed without difficulties.

The present invention also includes cellulose derivatives which conform to the formula

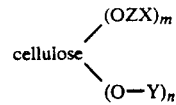

wherein

Z represents an alkylene, alkenylene, alkynylene radical (straight-chain and/or branched, wherein the carbon chain can also be interrupted by heteroatoms such as O, S, N, P, Si as well as —CO—, —CONR— or COO— groups), which may or may not be substituted, and/or a cycloalkylene radical (which may or may not have heteroatoms and/or may or may not be substituted) and/or an arylene and/or arylalkylene and/or arylalkenylene and/or arylalkynylene radical (which may or may not hve heteroatoms and/or may or may not be substituted) and/or a bisarylalkylene and/or bisarylene radical (which may or may not be substituted) and or a condensed aromatic compound radical (which may or may not be substituted) and/or a heterocyclic compound radical (which may or may not be substituted);

X represents —H, and/or —NR$_2$ and/or —N+R$_3$ and/or COOH even as a salt and/or —COOR and/or CONR$_2$ and/or —CO—R and/or —CS—R and/or —CSOH even as a salt and/or —CSOR and/or CSNR$_2$ and/or —SO$_3$H even as a salt and/or —SO$_3$R and/or —SO$_2$—R and/or —SO$_2$NR$_2$ and/or —SR and/or —SOR and/or —SONR$_2$ and/or —PO$_3$H$_2$ even as a salt and/or —PO(OR)$_2$ and/or PO$_2$H(NR$_2$) and/or —PO(NR$_2$)$_2$ and/or PO$_2$H$_2$ and/or —POH(OR) and/or —CN and/or —NO$_2$ and/or —OR and/or halogen and/or —Si(OR)$_3$;

wherein

R is a hydrogen atom and/or an alkyl and/or alkynyl and/or alkenyl group with 1 to 25 C atoms (straight-chain and/or branched, and which may or may not be substituted) and/or a cycloalkyl group (which may or may not have neteroatoms and/or may or may not be substituted) and/or a tolyl and/or benzyl and/or phenyl group (which may or may not have heteroatoms and/or may or may not be substituted;

and

Y is a CS—R' and/or CO—OR' and/or CSNH—R' and/or CSNR'$_2$ and/or SO$_2$—OR' and/or SO$_2$—R' and/or SO$_2$NR'$_2$ and/or SO—R' and/or SONR'$_2$ and/or PO$_3$H$_2$ (salt) and/or PO$_2$R'$_2$ and/or POR'$_2$ and/or PO(OR')$_2$ radical;

and

R' represents hydrogen and/or alkyl, alkenyl, alkynyl group with 1 to 36 carbon atoms (straight-chain and/or branched, wherein the carbon chain can also be interrupted by heteroatoms such as O S, N, P, Si as well as CO—, CONR— or COO—groups), which may or may not be substituted and/or a cycloalkyl radical (which may or may not hve heteroatoms and/or may or may not be substituted) and/or an aryl and/or arylalkyl and/or arylalkenyl and/or arylalkynyl radical (which may or may not have heteroatoms and/or may or may not be substituted) and/or a bisarylalkyl and/or bisaryl radical (which may or may not be substituted) and/or a condensed aromatic compound radical (which may or may not be substituted) and/or a heterocyclic compound radical (which may or may not be substituted);
wherein
m=0 to 2.5 n=0.01 to 2.95,
and also the degree of polymerization is higher than which can be synthesized by homogeneous reaction in a mixture of dimethylacetamide and/or N-methylpyrrolidone with LiCl, preferably after activation of the cellulose starting material in the absence of LiCl.

Cellulose derivatives are preferred wherein Y is selected from the group consisting of alkyl radicals having from 1 to 4 carbon atoms, and $(CH_2)_r$—COOH radicals where r=0, 1 or 2, and m=0, n≦0.4 or n≧0.80.

Cellulose derivatives according to a preferred embodiment are characterized in that
m=.05 to 1.0
n=0.02 to 2.75,
and in that they can be synthesized by homogeneous reaction of a water-insoluble cellulose ether of the general formula

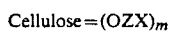

Cellulose=$(OZX)_m$ in a mixture of dimethylacetamide and/or N-methylpyrrolidone with lithium chloride, wherein Z, X and m have the same meaning as in the end product.

In another preferred embodiment, the cellulose derivatives are characterized in that m=0 and n=1.0 to 2.0.

In another preferred embodiment according to the invention, the cellulose derivatives are characterized in that m=0.2 to 0.6 and n=0.2 to 2.0.

Preferably the degree of polymerization is higher than 600.

Cellulose derivatives according to the invention are preferably used in a mixture with cellulose, the mixture containing 1 to 20 weight percent of the cellulose derivative.

The process according to the invention for the synthesis of the cellulose derivatives according to the invention is characterized in that cellulose and/or a corresponding waterinsoluble cellulose ether is activated in dimethylacetamide and/or N-methylpyrrolidone and/or water and, after replacement of water by dimethylacetamide or N-methylpyrrolidone if necessary, is dissolved after addition of lithium chloride, in that reaction is effected in a manner known in itself with appropriate anhydrides, isocyanates, acid chlorides, ketenes, diketenes, lactones, or sulfones.

Preferably the activation stage is performed with dimethylacetamide and/or N-methylpyrrolidone at 120° to 160° C. and the lithium chloride is added after cooling to below 100° C.

When water is used, the activation stage is performed at temperatures of 20° to 120° C. and the water is replaced at ambient temperature.

In a preferred embodiment of the process, the reaction of the cellulose derivatives is performed in a mixture of 92 to 88 weight percent of dimethylacetamide and/or N-methylpyrrolidone and 8 to 12 weight percent of lithium chloride.

In the homogeneous reaction, the weight proportion of the cellulose or of the water-insoluble cellulose ether in the solution mixture is preferably 5 weight percent to 30 weight percent.

Membranes and fibers or filaments can be made without difficulties in a manner known in itself, directly or after isolation, purification and redissolution, from the solutions of the derivatives. The use of the cellulose derivatives according to the invention are particularly suitable for use as membranes for reverse osmosis or dialysis, especially for hemodialysis.

The new derivatives exhibit unexpected properties. Thus it is possible largely to neutralize adverse intolerance reactions of the patient in the case of membranes for hemodialysis. In particular, beta-2 microglobulin, which causes the carpal tunnel syndrome, is adsorbed so extensively on dialysis membranes formed of the cellulose derivatives of the present invention that the danger of the carpal tunnel syndrome is largely prevented.

In the scope of the present invention, the complement activation was evaluated on the basis of the C3a or C5a fragments. For this purpose, 300 ml of heparinized blood plasma was recirculated in vitro, for a period of 4 hours with a plasma flow of 100 ml/min, through a dialyzer with 1 $m^2$ effective exchange area. The C3a or C5a fragments were determined in the plasma by means of the RIA method (Upjohn test). The relative complement activation for the particular measurement instant was calculated as a percentage in the form of the ratio of the concentration at the instant of sampling to the initial value. The measured value after a recirculation time of 4 hours was used for the evaluation. Flat membranes are incubated for 3 hours with heparinized blood plasma and thereafter the C3a or C5a fragments are determined.

The evaluation of the beta-2 microglobulin level in long-term dialysis patients is observed after the use of membranes of regenerated cellulose, and on this basis it is deduced that these membranes have little permeability for substances in the molecular weight range of 1,000 to 20,000, and so those latter are not removed to a sufficient extent during dialysis. The beta-2 microglobulin is not adsorbed to a notable extent on the standard membranes of regenerated cellulose. However, the cellulose derivatives according to the invention can contribute in unexpected manner to such adsorption.

In the scope of the invention, the beta-2 microglobulin fraction adsorbed on the membrane is measured in the following manner.

To 500 mg samples of substance (dialysis membrane), 10 ml of human blood plasma is added and allowed to incubate for 30 minutes at 37° C. The human blood plasma has a beta-2 microglobulin content of 13.67 mg/liter. The sample is centrifuged at 3,000 rpm for 15 mintues. The concentration of beta-2 microglobulin in the supernatant is measured. Thereafter the sample is washed twice, in each case with 10 ml of phosphate buffer saline. The microglobulin concentration in the washing liquids is also measured. The percentage amount of absorbed beta-2 microglobulin can be calculated from the difference between initial and nonabsorbed beta-2 microglobulin.

The cellulose derivatives according to the invention were used for making fibers or filaments and thereby modified cellulose fibers with new kinds of properties were made in a simple way.

Such a use of the cellulose derivatives consists in using the cellulose derivatives according to the invention in a mixture with chitin and/or polyacrylonitrile and/or polyamide for making membranes, fibers or filaments, the weight of the cellulose derivative amounting to 60 to 99%, preferably 75 to 95% of the weight of the mixture.

By reaction of the cellulose dissolved in DMAc or NMP/LiCl with acid chlorides, acid anhydrides, ketenes, diketenes, lactones, sulfones or isocyanates, there were synthesized, in a simple manner, cellulose derivatives of different degrees of substitution, which were spun, directly or after isolation, purification and redissolution, to fibers with spinnerets which are standard for rayon. In the process, modified cellulose and composite fibers with new kinds of properties dependent on the type of substitution and degree of substitution were made, such as, for example:

fibers of cellulose esters of lower carboxylic acids with variable hydrophilic properties, fibers of cellulose esters of higher carboxylic acids with softening or hydrophobic effects, fibers which can be easily dyed in mixtures with other polymers.

The average degree of polymerization DP was determined in a cupriethylenediamine solution in accordance with DIN 54270.

The degree of etherification and/or degree of esterification was determined on the basis of the analysis results which are known and typical for the substituents, for example nitrogen by the Kjeldahl method, sulfur by the Schoniger method or phosphorus by the molybdate method, if necessary from the difference before and after saponification.

The strength and elongation were determined in accordance with DIN Specification 53834, Part 1, February 1976 version. The conditioning stage lasted 24 hours at 65% relative humidity and 20° C. The wet strengths were measured on yarns which had been immersed for 1 hour in water (containing 1 g/liter of a nonionic surfactant) and from which the excess liquid had been hydroextracted.

EXAMPLE 1

In a 2 liter three-necked flask, 95.85 g (0.5 mol) of diethylaminoethylcellulose (DS=0.25; DP=1,170, measured in cupriethylenediamine solvent) was suspended in 1,006.4 g (11.57 mol) of dimethylacetamide and activated at 145° C. for 30 minutes under nitrogen. After cooling to 100° C., 95.8 g (2.25 mol) of LiCl was added, the temperature rising by 5° to 10° C.; thereafter the mixture was cooled rapidly to room temperature (RT always 20° to 25° C.) and stirred over night. 6 g (0.06 mol) of potassium acetate (catalyst) and 59.2 g (0.40 mol) of phthalic anhydride were added to the clear viscous solution. To complete the reaction, the reaction mixture was further stirred for 6 hours at 65° C. and for 15 hours at room temperature. The obtained diethylaminoethylcellulose phthalate solution was filtered, deaerated and spun to hollow yarns.

Isopropyl myristate was used as the lumen filling.

The diethylaminoethylcellulose phthalate membranes obtained in this way exhibited the following properties:

| | |
|---|---|
| content of diethylaminoethyl groups: | m = 0.24 |
| content of phthalate groups: | n = 0.28 |
| degree of polymerization (DP): | 1080 |
| wall thickness: | 14 microns |
| inside diameter: | 200 microns |
| ultrafiltration rate: | 4.0 ml/hr · m$^2$ · mm Hg at 37° C. |

-continued

| | |
|---|---|
| vitamin B12 permeability: | 4.8 × 10$^{-3}$ cm/min at 37° C. |
| beta-2 microglobulin adsorption: | 50% |

Compared with the unmodified cellulose membranes, the above-mentioned cellulose derivative membrane exhibits less complement activation. Compared with the unmodified cellulose membrane, the C3a reduction is 80%.

EXAMPLES 2 TO 11

By analogy with Example 1, the cellulose derivatives listed in Table 1 were synthesized and spun to hollow yarns, and their dialysis and biocompatibility properties were examined.

EXAMPLES 12 TO 14

On the basis of the procedure of Example 1, the following cellulose derivatives were synthesized in DMAc/LiCl and processed to flat membranes, and their complement activation was determined on the basis of the C3a fragments. The results are listed in Table 2.

EXAMPLES 15 to 19

By analogy with Example 1, various cellulose derivatives were synthesized and spun to hollow yarns, and their membrane flow properties as well as their complement activation were determined on the basis of the C5a fragments. The results are listed in Table 3.

EXAMPLES 20 TO 39

By analogy with Example 1, the cellulose derivatives listed in Table 4 were synthesized and processed to flat membranes, and their complement activation was determined on the basis of the C5a fragments. The results are listed in Table 4.

EXAMPLE 40

In a 2 liter three-necked flask, 81 g (0.5 mol) of cellulose (DP 980, measured in cupriethylenediamine solvent) was suspended in 1,000.5 g (11.50 mol) of dimethylacetamide and activated at 150° C. for 30 minutes under nitrogen. After cooling to 100° C., 95.8 g (2.25 mol) of LiCl was added, the temperature rising by 5° to 10° C.; thereafter the mixture was cooled rapidly to room temperature (RT always 20° to 25° C.) and stirred over night. 6 g (0.06 mol) of potassium acetate (catalyst) and 66.5 g (0.50 mol) of dodecenylsuccinic anhydride were added to the clear viscous solution. To complete the reaction, the reaction mixture was stirred for 8 hours at 70° C. and further stirred for 15 hours at room temperature. The obtained cellulose dodecenylsuccinate solution was filtered, deaerated and processed to flat membranes. The membranes exhibited a DS of 0.35 and a DP of 910. Compared with the unmodified cellulose membrane, the C5a reduction was 100%.

EXAMPLES 41 to 82

By analogy with Examples 1 to 40, the cellulose derivatives listed in Table 5 (Examples 41 to 53), Table 6 (Examples 54 to 72) and Table 7 (Examples 73 to 82) were synthesized from cellulose or cellulose ethers and processed to flat membranes, their complement activation was determined on the basis of the C5a fragments and their beta-2 microglobulin adsorption was measured. The results are listed in Tables 5, 6 and 7.

EXAMPLE 83

In a 2 liter three-necked flask, 97.33 g (0.50 mol) of diethylaminoethylcellulose (DS=0.33; DP=1040, measured in cupriethylenediamine solvent) was suspended in 1,000.5 g (11.50 mol) of dimethylacetamide and activated at 145° C. for 30 minutes under nitrogen. After cooling to 100° C., 97.61 g (2.3 mol) of LiCl was added, the temperature rising by 5° to 10° C.; thereafter the mixture was cooled rapidly to room temperature (room temperature always 20° to 25° C.) and stirred over night.

12 g (0.15 mol) of pyridine (catalyst) and 83.3 g (0.70 mol) of phenyl isocyanate were added to the clear viscous solution. To complete the reaction, the reaction mixture was further stirred for 8 hours at room temperature. The obtained diethylaminoethylcellulose phenylcarbamate solution was filtered, deaerated and processed to flat membranes.

The membranes obtained in this way exhibited the following properties:
content of diethylaminoethyl groups: m=0.32
content of phenylcarbamate groups: n=0.52
degree of polymerization (DP): 970

Compared with the unmodified cellulose membrane, the C5a reduction is 100%.

EXAMPLES 84 TO 100

On the basis of the procedure of Examples 83, 40 and 1, the cellulose derivatives listed in Table 8 were synthesized and processed to flat membranes, their complement activation was determined on the basis of the C5a fragments and, for some derivatives, the beta-2 microglobulin adsorption was measured. The results are listed in Table 8.

EXAMPLES 101 TO 109

The derivatives listed in Table 9 were synthesized by reacting cellulose or cellulose ethers in DMAc/LiCl with thiocyanates, thioacid chlorides, sulfonyl chlorides, chloroformic acid esters or $SO_3$-pyridine complex in the presence of pyridine, and their biocompatibility properties were examined. The results are listed in Table 9.

EXAMPLES 110 TO 119

Table 10 lists examples of mixed membranes which were made from dimethylacetamide/LiCl solutions by the following procedures:
a. by mixing cellulose derivatives synthesized in DMAc/LiCl
b. by mixing cellulose derivativeds synthesized in DMAc/LiCl with commercial cellulose derivatives
c. by mixing cellulose derivatives synthesized in DMAc/LiCl with a natural or synthetic polymer.

The measured values of the reduction in C5a in comparison with unmodified cellulose are listed in Table 10.

EXAMPLES 120 TO 126

Since not only cellulose and cellulose derivatives but also other natural or synthetic polymers such as chitin, PAN, PA and others are readily soluble in the DMAc/LiCl or NMP/LiCl solvent system, a plurality of mixed membranes of different compositions can be made.

By analogy with Example 1, various cellulose derivatives were synthesized, mixed with chitin, PAN or PA and spun to hollow yarns. The membranes obtained in this way exhibited the properties listed in Table 11.

EXAMPLES 127 TO 132 the basis of the procedure of Example 1, various cellulose derivatives were synthesized and spun to textile yarns with spinnerets which are standard for rayon. The textile properties of the resulting yarn are listed in Table 12.

The cellulose ester fibers with a degree of esterification of $n<2$, made by the process according to the invention, exhibit a cotton-like character, i.e., a more pronounced hydrophilic nature than the 2,5-acetate fibers (WRP: 15 to 18%) or triacetate fibers (WRP: 6 to 9%) made by known processes. Moreover, ester fibers with a degree of esterification of $n<1.6$ can be dyed even with normal cellulose dyes, and are very suitable for mixtures with cellulose fibers. Higher alkyl radicals (Examples 131 and 132) additionally impart a permanent soft handle to the ester fibers, so that fabrics of such fibers do not have to be treated with the normal softening rinses. Hydrophilic nature and soft handle are known to be fiber properties which are important for wearing comfort.

Although the spinning tests were performed in a spinning machine which has not yet been industrially optimized, the textile data such as conditioned and wet strength (Examples 127 to 132) have significantly higher values than those of known normal acetate fibers (conditioned strength: 9.7 to 11.5 cN/tex; wet strength: 5.7 to 6.6 cN/tex; Handbook of textile fibers, J. Gordon Cook, 1984).

In contrast to cellulose fibers, cellulose carbamate fibers as described in Example 132 can be dyed even with normal wool and polyamide dyes, and therefore are particularly suitable for mixtures with the said fibers.

EXAMPLES 133 TO 135

Cellulose derivatives which had been made by analogy with Example 1 were mixed with natural or synthetic polymers and spun to textile yarns with spinnerets which are standard for rayon. The textile properties of the yarns are listed in Table 13.

Cellulose acetate/chitin yarns are described in Example 133 exhibit pronounced hydrophilic nature and can by dyed both with cellulose and with wool dyes.

Mixed yarns such as those of Examples 134 and 135 also exhibit the hydrophilic nature of cellulose fibers and can be textured if necessary, for example to impart more bulk to the fibers.

The microscopic examinations revealed that separation of the polymers had occurred in the yarns of Examples 134 and 135, whereas a homogeneous mixture is obtained in Example 133.

TABLE 1

| Example | —Z—X | m | Y | n | DP | Wall thickness (μm) | Inside diameter (μm) | UFR ml/h·m²·mmHg at 37°C | Vit. B₁₂– Perm. cm/min. at 37°C × 10⁻³ | C3a Red. (%) | B₂ microglobulin Adsorp. (%) |
|---|---|---|---|---|---|---|---|---|---|---|---|
| 2 | $C_2H_4N(C_2H_5)_2$ | 0.39 | $CH_3$ | 2.41 | 980 | 12 | 200 | 4.3 | 5.1 | 95 | 40 |
| 3 | $C_2H_4N(C_2H_5)_2$ | 0.33 | $CH_3$ | 2.26 | 1050 | 11 | 205 | 4.5 | 5.2 | 85 | 35 |
| 4 | $C_2H_4N(C_2H_5)_2$ | 0.35 | $CH_3$ | 1.72 | 1020 | 12 | 195 | 4.1 | 4.9 | 87 | 30 |
| 5 | $C_2H_4N(C_2H_5)_2$ | 0.16 | $CH_3$ | 1.80 | 1100 | 13 | 203 | 4.6 | 5.4 | 80 | 20 |
| 6 | $C_2H_4N(C_2H_5)_2$ | 0.30 | $C_2H_5$ | 1.65 | 890 | 12 | 202 | 4.0 | 4.3 | 100 | — |
| 7 | $C_2H_4N(C_2H_5)_2$ | 0.28 | $C_{17}H_{35}$ | 0.25 | 620 | 10 | 200 | 4.2 | 4.3 | 95 | — |
| 8 | $CH_2COOH$ | 0.23 | $CH_3$ | 2.15 | 600 | 12 | 205 | 4.5 | 5.7 | 90 | 25 |
| 9 | $CH_2COOH$ | 0.13 | $CH_3$ | 2.54 | 605 | 10 | 201 | 4.4 | 5.3 | 75 | 15 |
| 10 | $C_2H_4SO_3H$ | 0.12 | $CH_3$/ | 2.02/ | 600 | 11 | 203 | 4.0 | 4.6 | 79 | 30 |
| 11 | 0 | | $C_6H_4$—COOH | 0.34 | 610 | 12 | 200 | 4.1 | 4.8 | 97 | 75 |

TABLE 2

| Example | m | Y | n | DP | C3a reduction, % |
|---|---|---|---|---|---|
| 12 | 0 | $CH_3$ | 1.60 | 830 | 55 |
| 13 | 0 | $C_3H_7$ | 2.50 | 620 | 90 |
| 14 | 0 | $C_6H_5NH$ | 2.50 | 840 | 50 |

TABLE 3

| Example | m | Y | n | DP | Wall thickness (μm) | Inside diameter (μm) | UFR ml/h·m²·mm HG at 37°C | Vit. B₁₂– Perm. cm/min. at 37°C × 10⁻³ | C5a Red. % |
|---|---|---|---|---|---|---|---|---|---|
| 15 | 0 | $CH_3$ | 1.71 | 605 | 8 | 205 | 34.1 | 14.8 | 40 |
| 16 | 0 | $CH_3$ | 1.86 | 1650 | 10 | 200 | 4.5 | 5.2 | 45 |
| 17 | 0 | $C_2H_5$ | 1.78 | 610 | 11 | 220 | 4.2 | 4.7 | 100 |
| 18 | 0 | $C_2H_5$ | 2.20 | 620 | 8 | 210 | 25.4 | 12.3 | 95 |
| 19 | 0 | $CH_2=C(CH_3)$ | 1.60 | 750 | 12 | 205 | 4.8 | 5.3 | 50 |

TABLE 4

| Example | m | Y | n | DP | C5a Red. % |
|---|---|---|---|---|---|
| 20 | 0 | $C_2H_5$ | 1.51 | 940 | 81 |
| 21 | 0 | $C_2H_5$ | 1.96 | 890 | 100 |
| 22 | 0 | $C_3H_7$ | 1.20 | 1050 | 100 |
| 23 | 0 | $C_{11}H_{23}$ | 0.75 | 970 | 85 |
| 24 | 0 | $C_{17}H_{35}$ | 0.06 | 1060 | 100 |
| 25 | 0 | $C_{17}H_{35}$ | 0.12 | 1010 | 100 |
| 26 | 0 | $C_{17}H_{35}$ | 0.14 | 870 | 98 |
| 27 | 0 | $C_{17}H_{33}$ | 0.35 | 790 | 70 |
| 28 | 0 | $C_6H_5$ | 1.46 | 780 | 85 |
| 29 | 0 | $C_6H_5$ | 1.00 | 860 | 95 |
| 30 | 0 | $C_6H_5-CH_2$ | 0.67 | 1010 | 85 |
| 31 | 0 | $CH_2=CH$ | 1.75 | 950 | 65 |
| 32 | 0 | $C_{17}H_{35}COCH(C_{16}H_{33})$ | 0.04 | 1060 | 100 |
| 33 | 0 | $CH_3/C_2H_5$ | 0.80/1.70 | 650 | 100 |
| 34 | 0 | $CH_3/C_2H_5$ | 1.10/0.85 | 620 | 97 |
| 35 | 0 | $C_2H_5/C_3H_7$ | 1.30/1.05 | 610 | 98 |
| 36 | 0 | $C_2H_5/C_3H_7$ | 1.65/0.35 | 615 | 100 |
| 37 | 0 | $CH_3/C_{18}H_{37}NHC_6H_4$ | 1.90/0.07 | 600 | 93 |
| 38 | 0 | $CH_3/C_{18}H_{35}$ | 1.80/0.14 | 610 | 99 |
| 39 | 0 | $CH_3/C_2F_5$ | 1.20/0.80 | 605 | 86 |

TABLE 5

| Example | m | Y | n | DP | C5a Red. (%) | Beta-2-Microgl. ads. (%) |
|---|---|---|---|---|---|---|
| 41 | 0 | $HOOCCH=CH$ | 0.09 | 640 | 70 | 15 |
| 42 | 0 | $HOOCC_2H_4$ | 0.08 | 650 | 65 | 14 |
| 43 | 0 | $HOOCC_6H_4$ | 0.40 | 610 | 88 | 65 |
| 44 | 0 | $HOOC(CH_2)_8$ | 0.25 | 950 | 92 | 47 |
| 45 | 0 | $C_{11}H_{23}CH=C(CH_2COOH)$ | 0.17 | 890 | 100 | 38 |
| 46 | 0 | $C_{11}H_{23}CH=C(CH_2COOH)$ | 0.58 | 630 | 100 | 72 |
| 47 | 0 | $C_{11}H_{23}CH=C(CH_2COOH)$ | 0.09 | — | 100 | — |
| 48 | 0 | $CH_3/HOOCC_2H_4$ | 1.96/0.08 | 680 | 90 | — |
| 49 | 0 | $CH_3/C_{11}H_{23}CH=C(CH_2COOH)$ | 1.95/0.07 | 630 | 98 | 25 |
| 50 | 0 | $CH_3/HOOCC_6H_4$ | 1.80/0.35 | 605 | 96 | 70 |
| 51 | 0 | $CH_3/HOOCCH(SO_3H)CH_2$ | 1.90/0.08 | 615 | 99 | 38 |
| 52 | 0 | $C_2H_5/HOOCCH(Cl)CH_2$ | 1.87/0.09 | 625 | 98 | 18 |
| 53 | 0 | $C_{11}H_{23}(OCH(C_{10}H_{21})/HOOCC_6H_4$ | 0.08/0.30 | 650 | 100 | 60 |

TABLE 6

| Example | —Z—X | m | Y | n | DP | C5a Red. (%) | Beta-2-Microglobulin ads. (%) |
|---|---|---|---|---|---|---|---|
| 54 | $C_2H_4-N(C_2H_5)_2$ | 0.33 | $CH_3$ | 2.26 | 850 | 100 | — |

TABLE 6-continued

| Example | —Z—X | m | Y | n | DP | C5a Red. (%) | Beta-2-Micro-globulin ads. (%) |
|---|---|---|---|---|---|---|---|
| 55 | $C_2H_4$—$N(C_2H_5)_2$ | 0.25 | $C_{17}H_{35}$ | 0.10 | 1120 | 100 | — |
| 56 | $C_2H_4$—$N(C_2H_5)_2$ | 0.35 | $C_{17}H_{33}$ | 0.15 | 1090 | 100 | — |
| 57 | $C_2H_4$—$N(C_2H_5)_2$ | 0.20 | $C_{17}H_{35}COCH(C_{16}H_{33})$ | 0.05 | 1150 | 100 | — |
| 58 | $C_2H_4$—$N(C_2H_5)_2$ | 0.10 | HOOCCH=CH | 0.10 | 1040 | 92 | 30 |
| 59 | $C_2H_4$—$N(C_2H_5)_2$ | 0.33 | HOOC—$C_6H_4$ | 0.28 | 1020 | 100 | 55 |
| 60 | $C_2H_4$—$N(C_2H_5)_2$ | 0.30 | $C_{11}H_{23}CH=C(CH_2COOH)$ | 0.40 | 1090 | 100 | 65 |
| 61 | $C_2H_4$—$N(C_2H_5)_2$ | 0.20 | HOOC—$(CH_2)_8$ | 0.21 | 1010 | 100 | 50 |
| 62 | $C_2H_4$—$N(i$—$C_3H_7)_2$ | 0.10 | $C_3H_7$ | 1.20 | 1120 | 98 | — |
| 63 | $C_2H_4$—$N(C_{12}H_{25})_2$ | 0.08 | $C_2H_5$ | 1.80 | 1040 | 100 | — |
| 64 | $C_2H_4$—$N(C_{18}H_{37})_2$ | 0.05 | $CH_3/C_2H_5$ | 0.8/1.15 | 1010 | 95 | — |
| 65 | $C_2H_4$—$N(C_{12}H_{24}OH)$ | 0.13 | $C_6H_5$ | 0.80 | 1130 | 98 | — |
| 66 | $C_2H_4$—$N(CH_2C_6H_5)_2$ | 0.20 | $HOOCC_3H_6$ | 0.25 | 980 | 97 | 47 |
| 67 | $C_2H_4$—$NC_5H_{10}$ | 0.10 | $C_2H_5$ | 1.60 | 1050 | 100 | — |
| 68 | $C_2H_4$—$NC_4H_8O$ | 0.15 | $C_{18}H_{37}OCOCH=CH$ | 0.12 | 1060 | 90 | — |
| 69 | $C_2H_4CH$ | 0.60 | $CH_3$ | 1.68 | 880 | 85 | — |
| 70 | $C_2H_4$—$SO_3H$ | 0.05 | $C_{11}H_{23}$ | 0.60 | 960 | 95 | 20 |
| 71 | $C_2H_4$—$SO_2C_{12}H_{25}$ | 0.10 | $HOOCCH(SO_3H)CH_2$ | 0.27 | 790 | 100 | 70 |
| 72 | $C_2H_4$—$PO_3H_2$ | 0.08 | $C_{17}H_{33}$ | 0.20 | 640 | 92 | 29 |

TABLE 7

| Example | —Z—X | m | Y | n | DP | C5a Red (%) | Beta-2-Micro-globulin ads. (%) |
|---|---|---|---|---|---|---|---|
| 73 | $CH_2COOH$ | 0.09 | $CH_3$ | 2.74 | 630 | 85 | 15 |
| 74 | $CH_2PO_3H_2$ | 0.13 | $CH_3$ | 1.87 | 605 | 82 | 35 |
| 75 | $C_3H_6SO_3H$ | 0.11 | $C_2H_5$ | 1.75 | 610 | 100 | 25 |
| 76 | $C_3H_6Si(OCH_3)_3$ | 0.08 | $C_{15}H_{31}CH=C(CH_2COOH)$ | 0.35 | 700 | 100 | 60 |
| 77 | $C_{12}H_{24}(OH)$ | 0.30 | HOOC—$C_6H_4$ | 0.25 | 1040 | 96 | 64 |
| 78 | $C_{18}H_{37}$ | 0.08 | $HOOCC_2H_4$ | 0.20 | 870 | 100 | 32 |
| 79 | $CH_2OC_{16}H_{33}$ | 0.07 | $C_3H_7$ | 1.00 | 920 | 100 | — |
| 80 | $CH_2C_6H_5$ | 0.70 | $CH_3$ | 1.45 | 1050 | 80 | — |
| 81 | $CH_2$—$CH=CH_2$ | 0.35 | $CH_3$ | 1.55 | 940 | 82 | — |
| 82 | $(CH_2)_9COOH$ | 0.10 | $C_2H_5$ | 1.65 | 850 | 98 | 37 |

TABLE 8

| Example | m | Y | n | DP | C5a Red (%) | Beta-2-Micro-globulin ads. (%) |
|---|---|---|---|---|---|---|
| 84 | 0 | $C_4H_9NH$ | 0.53 | 1070 | 100 | — |
| 85 | 0 | $C_4H_9NH$ | 0.77 | 630 | 99 | — |
| 86 | 0 | $C_4H_9NH$ | 1.62 | 720 | 85 | — |
| 87 | 0 | $C_6H_5NH$ | 0.91 | 1040 | 95 | — |
| 88 | 0 | $C_6H_5NH$ | 1.61 | 770 | 92 | — |
| 89 | 0 | $C_6H_5NH$ | 1.85 | 690 | 90 | — |
| 90 | 0 | $C_6H_4(CH_3)NH$ | 0.93 | 890 | 92 | — |
| 91 | 0 | $C_6H_{11}NH$ | 1.17 | 840 | 97 | — |
| 92 | 0 | $CH_3/C_4H_9NH$ | 1.85/0.43 | — | 86 | — |
| 93 | 0 | $HOOCC_2H_4/C_6H_5NH$ | 0.23/0.90 | — | 100 | 35 |
| 94 | 0 | $C_{11}H_{23}CH=C(CH_2COOH)/C_6H_5NH$ | 0.25/0.90 | — | 100 | 50 |
| 95 | 0 | $HOOCC_6H_4/C_6H_5NH$ | 0.30/1.20 | — | 100 | 68 |
| 96 | 0 | $C_{18}H_{37}NH$ | 0.10 | — | 100 | — |
| 97 | 0 | $C_6H_4(Cl)NH$ | 0.80 | — | 79 | — |
| 98 | 0 | $HOOCCH=CH/C_6H_4(CH_3)NH$ | 0.30/1.10 | — | 100 | 43 |
| 99 | 0 | $C_4H_9NH/C_6H_5NH$ | 0.43/0.85 | — | 100 | — |
| 100 | 0 | $C_2H_5/C_6H_4(CH_3)NH$ | 1.50/0.90 | — | 98 | — |

TABLE 9

| Example | —Z—X | m | Y | n | DP | C5a Red. (%) | Beta-2-Micro-globulin ads. (%) |
|---|---|---|---|---|---|---|---|
| 101 | — | 0 | $C_4H_9NHCS$ | 0.40 | 725 | 84 | — |
| 102 | — | 0 | $C_6H_5NHCS$ | 0.70 | 660 | 89 | — |
| 103 | $C_2H_4$—$N(C_2H_5)_2$ | 0.25 | $C_6H_5NHCS$ | 0.65 | 650 | 96 | — |
| 104 | — | 0 | $C_2H_5OCO$ | 0.45 | 640 | 65 | — |
| 105 | — | 0 | $C_{18}H_{37}OCO$ | 0.10 | 670 | 97 | — |
| 106 | — | 0 | $C_2H_5CS$ | 1.40 | 710 | 85 | — |
| 107 | $CH_2$—$C_6H_5$ | 1.60 | $SO_3H$ | 0.10 | 605 | 93 | 28 |
| 108 | — | 0 | $C_{12}H_{25}SO_2$ | 0.15 | 680 | 75 | — |
| 109 | $C_2H_4$—$N(C_2H_5)_2$ | 0.30 | $C_{18}H_{37}N(CH_3)SO_2$ | 0.07 | 620 | 100 | |

TABLE 10

| Example | Polymer A | Polymer B | Mixing ratio | C5a Red (%) |
|---|---|---|---|---|
| 110 | Cellulose-1.80-acetate | Cellulose-1.75-propionate | 30:70 | 95 |
| 111 | Cellulose-1.80-acetate | Cellulose-1.60-butyrate | 20:80 | 94 |
| 112 | Cellulose-1.80-acetate | Cellulose-0.53-butylcarbamate | 20:80 | 100 |
| 113 | Cellulose | Cellulose-0.35-dodecenylsuccinate | 80:20 | 100 |
| 114 | Diethylaminoethyl-0.10-cellulose | Cellulose-0.15-maleate | 20:80 | 96 |
| 115 | Cellulose-0.198-maleate | Cellulose-0.91-phenylcarbamate | 50:50 | 98 |
| 116 | Polyacrylonitrile | Cellulose-1.85-phenylcarbamate | 25:75 | 93 |
| 117 | Polyamide | Cellulose-0.40-phthalate | 20:80 | 100 |
| 118 | Chitin | Cellulose-0.20-stearate | 20:80 | 100 |
| 119 | Polyacrylonitrile | Cellulose-0.35-hexadecenylsuccinate | 25:75 | 100 |

TABLE 11

| Example | Polymer composition | Wall thickness (μm) | Inside diameter (μm) | UFR ml/ h · m² · mm Hg at 37° C. |
|---|---|---|---|---|
| 120 | Cellulose-0.08-acetate Chitin (3:1) | 13 | 180 | 7.2 |
| 121 | Cellulose-0.08-acetate/ PAN (3:1) | 10 | 215 | 8.5 |
| 122 | Cellulose-0.08-acetate/ PA (3:1) | 12 | 200 | 8.3 |
| 123 | Cellulose-0.7-acetate/ PAN (1:3) | 10 | 195 | 4.8 |
| 124 | Cellulose-0.2-succinate/ PAN (1:3) | 11 | 220 | 4.3 |
| 125 | Cellulose-0.35-butylcarbamate/ PAN (3:1) | 13 | 225 | 6.9 |
| 126 | Cellulose-1.71-acetate/PAN (1:3) | 12 | 240 | 4.1 |

TABLE 12

| Example | m | Y | n | Strength (cN/tex) cond. | Strength (cN/tex) wet | Elongation (%) cond. | Elongation (%) wet | WRP* per DIN 53814 (%) |
|---|---|---|---|---|---|---|---|---|
| 127 | 0 | $CH_3$ | 1.65 | 19.8 | 8.2 | 14.3 | 21 | 70 |
| 128 | 0 | $CH_3$ | 1.92 | 18.7 | 7.5 | 15.1 | 18 | 63 |
| 129 | 0 | $C_2H_5$ | 2.40 | 10.6 | 5.2 | 14.3 | 21 | 50 |
| 130 | 0 | $C_{17}H_{35}$ | 0.14 | 10.8 | 5.9 | 12.5 | 15 | 50 |
| 131 | 0 | $i\text{-}C_8H_{17}$ | 0.54 | 8.4 | | 9.5 | — | 60 |
| 132 | 0 | $C_4H_9NH$ | 0.36 | 8.9 | | 5.8 | — | 70 |

WRP = water retention power

TABLE 13

| Example | Polymer composition | Strength (cN/tex) cond. | Strength (cN/tex) wet | Elongation (%) cond. | Elongation (%) wet | WRP per DIN 53814 (%) |
|---|---|---|---|---|---|---|
| 133 | Cellulose-1.68-acetate/chitin (3:1) | 18.5 | 6.7 | 16 | 24 | 70 |
| 134 | Cellulose-1.68-acetate/PAN (3:1) | 14.2 | 6.1 | 18 | 20 | 65 |
| 135 | Cellulose-1.68-acetate/PA 6 (3:1) | 13.8 | 6.2 | 12 | 18 | 60 |

I claim:

1. A cellulose derivative which conforms to the following formula:

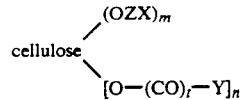

wherein

Z has a maximum carbon chain length of 18 carbon atoms and is selected from the group consisting of alkylene, alkenylene, and alkynylene radicals, which may be straight-chain or branched, and wherein the carbon chain may be interrupted by a member selected from the group consisting of O, S, N, P, Si, —CO—, —CONR—, and —COO—, and which may be substituted; cycloalkylene radicals, which may have heteroatoms selected from the group consisting of O, S, N, P and Si and which may be substituted, arylene, arylalkylene, arylalkenylene and arylalkynylene radicals, which may have heteroatoms selected from the group consisting of O, S, N, P and SI and which may be substituted; bisarylalkylene and bisarylene radicals, which may be substituted; condensed aromatic compound radicals, which may be substituted; and heterocyclic compound radicals, which may be substituted;

X is selected from the group consisting of —H, —$NR_2$ —$N^+R_3$, —COOH, a carboxylic acid salt, —COOR, $CONR_2$, —CO—R, —CS—R, —C-SOH, a salt thereof, —CSOR, $CSNR_2$, —$CO_3H$, a sulfonic acid salt, —$SO_3R$, —$SO_2$—R, —$SO_2NR_2$, —SR, —SOR, —SONR$_2$, —PO$_3$H$_2$, a salt thereof, —PO(OR)$_2$, PO$_2$H(NR$_2$), —PO(NR$_2$)$_2$, PO$_2$H$_2$, —POH(OR), —CN, —NO$_2$, —OR, halogen, and —Si(OR)$_3$;

R is selected from the group consisting of hydrogen; alkyl, alkynyl, and alkenyl groups having from 1 to 25 carbon atoms, which may be straight-chain or branched, and which may be substituted; cycloalkyl groups, which may have heteroatoms selected from the group consisting of O, S, N, P and Si and which may be substituted; and tolyl, benzyl, and phenyl groups, which may have heteroatoms selected from the group consisting of O, S, N, P and Si and which may be substituted;

t=0 or 1, such that when t=1,

Y is selected from the group consisting of a

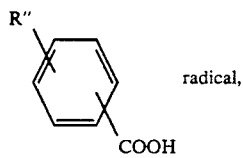

radical,

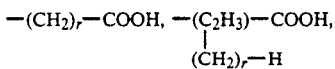

—(C$_2$R''$_4$)—COOH, —CR''=CR''—COOH, —(CH=CH—COOH); —NR'$_2$, —NHR', —NHSO$_2$R', and —R';

wherein

R' has a maximum carbon chain length of 18 carbon atoms and is selected from the group consisting of alkyl, alkenyl, and alkynyl groups having from 1 to 36 carbon atoms which may be straight-chain or branched and wherein the carbon chain may be interrupted by a member selected from the group consisting of O, S, N, P, Si, —CO—, —CONR—, and —COO—, and which may be substituted; cycloalkyl radicals, which may have heteroatoms selected from the group consisting of O, S, N, P and Si and which may be substituted; aryl, arylakyl, arylalkenyl, and arylalkynyl radicals, which may have heteroatoms selected from the group consisting of O, S, N, P and Si and which may be substituted; bisarylalkyl and bisaryl radicals, which may be substituted; condensed aromatic compound radicals, which may be substituted; and heterocyclic compound radicals, which may be substituted;

R'' is selected from the group consisting of X and R';
and
r=1 to 20;
m=0 to 2.5;
n=0.01 to 2.95;
and when
t=0, Y is a member selected from the group consisting of CS—R', CO—OR', CSNH—R', CSNR'$_2$, SO$_2$—OR', SO$_2$—R', SO$_2$NR'$_2$, SO—R', SONR'$_2$, PO$_3$H$_2$, PO$_2$R'$_2$, POR'$_2$, and PO(OR')$_2$;
and R' has a maximum carbon chain length of 18 carbon atoms and is a member selected from the group consisting of hydrogen; alkyl, alkenyl, and alkynyl groups having from 1 to 36 carbon atoms, which may be straight-chain or branched, wherein the carbon chain may be interrupted by a member selected from the group consisting of O, S, N, P, Si, —CO—, —CONR— and —COO—, and which may be substituted; cycloalkyl radicals which may have heteroatoms selected from the group consisting of O, S, N, P and Si and which may be substituted; aryl, arylalkyl, arylalkenyl, and arylalkynyl radicals, which may have heteroatoms selected from the group consisting of O, S, N, P and Si and which may be substituted; bisarylalkyl and bisaryl radicals, which may be substituted; condensed aromatic compound radicals, which may be substituted; and heterocyclic compound radicals, which may be substituted;

wherein
m=0 to 2.5
n=0.01 to 2.95, and
wherein a degree of polymerization of said derivative is higher than 400, and which is synthesized from cellulose in a mixture of LiCl and one or more members selected from the group consisting of dimethyl acetamide and N-methylpyrrolidone.

2. The cellulose derivative of claim 1, wherein said cellulose is activated in the absence of LiCl prior to synthesis into said cellulose derivative.

3. The cellulose derivative of claim 1, wherein t=1.

4. The cellulose derivative of claim 1, wherein t=0.

5. The cellulose derivative of claim 1, wherein Y is selected from the group consisting of an alkyl radical having from 1 to 4 carbon atoms and a (CH$_2$)$_r$—COOH radical, wherein r=0, 1 or 2, and m=0.

6. The cellulose derivative of claim 1, wherein n≦0.4.

7. The cellulose derivative of claim 1, wherein n≧0.8.

8. The cellulose derivative of claim 1, wherein
m=0.05 to 1.0, and
n=0.02 to 2.75, and which is synthesized by homogeneous reaction of a water-insoluble cellulose ether conforming to the formula

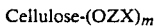

in a mixture of LiCl and one or more members selected from the group consisting of dimethylacetamide and N-methylpyrrolidone, wherein Z, X, and m have the same meaning as in claim 1.

9. The cellulose derivative of claim 1, wherein m=0 and n=1.0 to 2.0.

10. The cellulose derivative of claim 1, wherein m=0.2 to 0.6 and n=0.2 to 2.0.

11. The cellulose derivative of claim 1, wherein the degree of polymerization is higher than 600.

12. A process for the synthesis of the cellulose derivative of claim 1, wherein a member selected from the group consisting of cellulose and water-insoluble cellulose ethers is activated in a solvent selected from the group consisting of dimethylacetamide, N-methylpyrrolidone, and water and is dissolved after addition of lithium chloride, wherein reaction is effected with a member selected from the group consisting of anhydrides, isocyanates, acid chlorides, ketenes, diketenes, lactones, and sulfones.

13. The process of claim 12, wherein the cellulose derivative is activated using a solvent selected from the group consisting of dimethylacetamide and N-methylpyrrolidone at 120° to 160° C. and the lithium chloride is added after cooling to below 100° C.

14. The process according to claim 12, wherein the cellulose derivative is activated using water at temperatures of 20° to 120° C., and the water is replaced at ambient temperature.

15. The process of claim 12, wherein the cellulose derivative is synthesized in a mixture of from 92 to 88 weight percent of a solvent selected from the group consisting of dimethylacetamide and N-methylpyrrolidone, and from 8 to 12 weight percent of lithium chloride.

16. The process of claim 12, wherein, in said reaction, the weight proportion of the member selected from the group consisting of cellulose and water-insoluble cellulose ethers in the solution mixture is 5 weight percent to 30 weight percent.

17. A process for manufacturing fibers which comprises forming the cellulose derivative of claim 1 into a fiber.

18. A process for manufacturing fibers or membranes which comprises forming a mixture comprising the cellulose derivative of claim 1 and a member selected from the group consisting of chitin, chitin derivatives, polyacrylonitrile, and polyamide, and forming said mixture into an article of manufacture selected from the group consisting of fibers and membranes.

19. The process of claim 18, wherein the amount of the cellulose derivative in said mixture is from 60 to 99% of the weight of the mixture.

20. The process of claim 19, wherein the amount of the cellulose derivative in said mixture is from 75 to 95% of the weight of the mixture.

21. A process for manufacturing membranes which comprises forming the cellulose derivative of claim 1 into a membrane.

22. A composition comprising the cellulose derivatives of claim 1 and cellulose.

23. The composition of claim 22, wherein the mixture contains from 1 to 20 weight percent of said cellulose derivative.

* * * * *

UNITED STATES PATENT AND TRADEMARK OFFICE
CERTIFICATE OF CORRECTION

PATENT NO. : 5,008,385

DATED : April 16, 1991

INVENTOR(S) : Michael DIAMANTOGLOU

It is certified that error appears in the above-identified patent and that said Letters Patent is hereby corrected as shown below:

<u>IN THE ABSTRACT</u>:

Line 14, change "-N+$R_3$," to -- - $N^+R_3$,--;

Line 36, change "3" to --a--.

Col. 2, line 4, change "Kindney" to --Kidney--.

Col. 4, line 2, change "waterinsoluble" to --water-soluble--.

Col. 5, line 37 change "celulose" to --cellulose--.

line 52, change "stirrred" to --stirred--.

Col. 6, line 22, change "hve" to --have--;

line 51, change "substituted;" to --substituted);--;

line 65, change "hve" to --have--.

Col. 7, line 10, after "than" insert --400, and--;

line 47, change "waterinsoluble" to --water-insoluble--;

Col. 11, line 58, change "derivativeds" to --derivatives--.

UNITED STATES PATENT AND TRADEMARK OFFICE
CERTIFICATE OF CORRECTION

PATENT NO. : 5,008,385
DATED : April 16, 1991
INVENTOR(S) : Michael DIAMANTOGLOU It is certified that error appears in the above-identified patent and that said Letters Patent is hereby corrected as shown below:

Col. 12, line 11, before "the" insert --On--;

line 41, change "textile fibers" to ---Textile Fibers--;

line 59, change "by" to --be--.

Col. 13, Table 1, Example 11, in column n, last entry, change "0.34" to --.034--.

Col. 13, Table 1, Example 10, under the "Y" column, change "$CH_3$/" to --$CH_3$-- and under the "n" column, change "2.02/" to --2.20--.

Col. 13, Table 1, Example 11, under the "Y" column, change "$C_6H_4$-COOH" to --$CH_3$ $C_6H_4$-COOH-- and under the "n" column, change "0.34" to --2.02/-- .034

Col. 18, line 32, Claim 1, change "," (first occurrence) to --;--;

UNITED STATES PATENT AND TRADEMARK OFFICE
CERTIFICATE OF CORRECTION

PATENT NO. : 5,008,385
DATED : April 16, 1991
INVENTOR(S) : Michael DIAMANTOGLOU It is certified that error appears in the above-identified patent and that said Letters Patent is hereby corrected as shown below:

COL. 18, line 65, change "$-N+R_3,$" to -- $-N^+R_3,$ --.

Signed and Sealed this

Twenty-fourth Day of November, 1992

Attest:

DOUGLAS B. COMER

*Attesting Officer*   *Acting Commissioner of Patents and Trademarks*